May 8, 1956  J. L. PEAVEY  2,744,783
TWIN CONTROL GLARE SHIELDS
Filed Aug. 29, 1951

INVENTOR
JOSEPH L. PEAVEY

United States Patent Office 2,744,783
Patented May 8, 1956

2,744,783

TWIN CONTROL GLARE SHIELDS

Joseph L. Peavey, Meridian, Miss.; Anna Amelia Peavey, executrix of said Joseph L. Peavey, deceased Application August 29, 1951, Serial No. 244,208

2 Claims. (Cl. 296—97)

This invention relates to improvements in glare shields. It is more particularly intended for use on passenger automobiles and trucks.

An object of this invention is to provide a glare shield which will reduce the glare of oncoming headlights to a desirable amount.

It is a further object of this invention to provide a glare shield which has provisions for reducing glare, as stated above, but which also has an opening therethrough to permit unobstructed vision through a portion of the screen.

Another object of my invention is to provide a glare shield having another opening which is of greater transparency than the main portion of the shield, and to provide emergency tabs or windows which may be held within this last named opening to protect from intense glares coming from the sides of a vehicle, such as from the sun or electric lights.

These and other objects and advantages of the invention will appear from the following description and the accompanying drawing, in which.

Similar reference characters in the several figures indicate similar elements.

Figure 1:
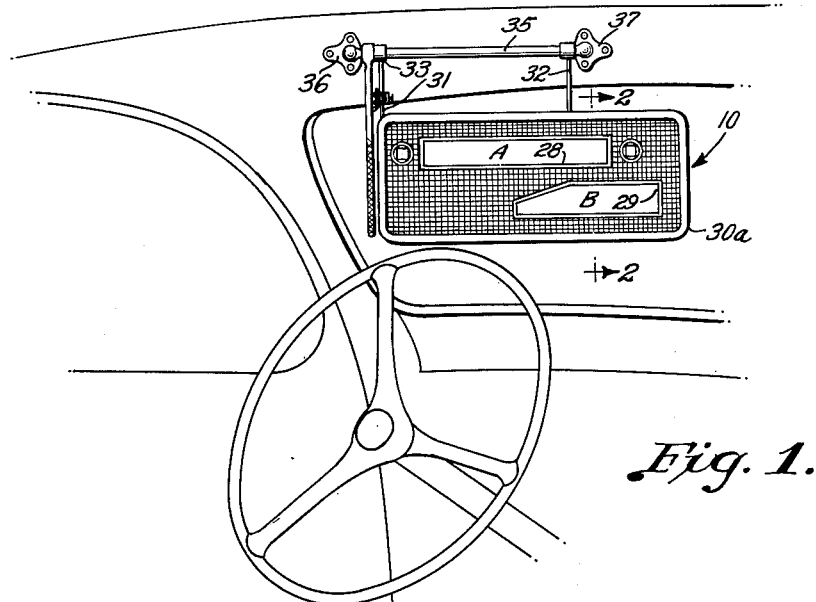
Figure 1 is a perspective view showing the invention as adapted to an automobile or truck.

The driver of an automobile or truck when approaching an oncoming vehicle ordinarily dims his lights as does the driver of the other vehicle. This is done for mutual advantage. However, even though the lights are dimmed somewhat there is still a considerable glare to annoy the approaching driver. Shields have been devised to eliminate this objectionable glare. However, the prior shields have been found to be unsatisfactory and are used by few operators.

As seen in the drawings, the shield proper or screen is generally indicated by the reference character 10. The shield proper consists of two main plates 11 and 12, of a transparent material, such as cellulose. Between plates 11 and 12 two small emergency tabs also of such a transparent material are mounted rotatably with respect to plates 11 and 12. In the preferred modification, plate 11 is colored green, plate 12 is colored red and tabs 13 and 14 are colored red but obviously other colors may be utilized.

Guards 15 and 16 of a suitable mesh are placed on the outer side of plates 11 and 12 respectively. The guards may be made of wire or other suitable material. Two knobs 17 and 18, which have projecting portions 19 and 20, project through guard 16, plate 17 and emergency tabs 13 and 14, and are, respectively, attached to said tabs. The tabs are rotatably mounted in screen 16 and plate 12 and tabs 13 and 14 can be rotated by turning said knobs.

It is to be noted that the plate 12 and guards 15 and 16 have aligned openings 21, 22 and 23 therethrough. Plates 11, 12 and guards 15, 16, have openings 24, 25, 26 and 27, respectively, said openings also being in alignment when the shield is assembled. As a result the shield has formed therein sighting opening A and B (see Figure 1). As shown in Figure 1, reinforcing elements 28 and 29 are provided for the openings in the screens. These elements may be made of metal or other suitable substance crimped or sewn onto the guards.

Figure 2:
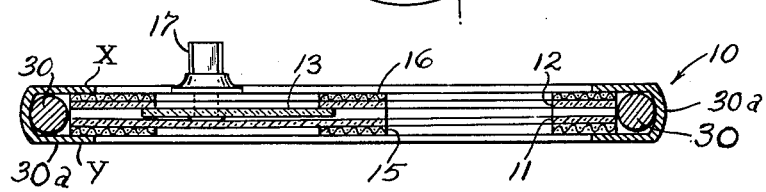
Figure 2 is a sectional view of the shield taken along line 2—2 of Fig. 1.
Figure 3:
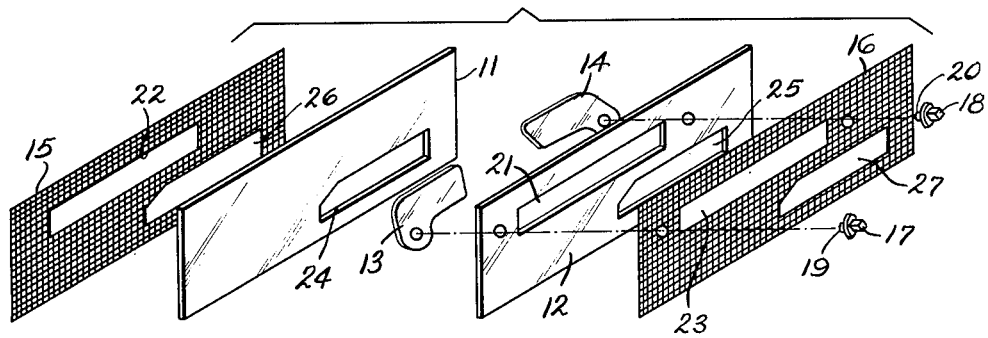
Figure 3 is an exploded perspective view of the shield.

When assembled, as seen in Figure 2, a beading or cording 30 of wire or other suitable material, is passed around the screen elements. Two connecting rods 31 and 32 (Figure 1) are passed through a tape 30a and fastened to the bead or cord as by sewing or stapling, etc. The rod 32 has two legs, not shown, which can be bent to run parallel to the cord along the upper edge of the screen and which are sewn to the cording. The tape 30 is sewn onto the screen by sewing through the screen at X—Y. Thus the tape is sewn along its two edges completely around the screen. The tape therefore encompasses all the elements of the screen and retains them in position, and the bead lends stiffness to the assembly.

The connecting rods 31 and 32 serve to support the shield and can be supplied with collars 33 and 34 for mounting on a shaft 35. The shaft 35 can in turn be supported in brackets 36 and 37 affixed to the vehicle.

As previously stated the screen has two sighting openings A and B. The opening A provides a shielded sight path through which the operator will look when looking straight ahead and a vehicle is approaching. The opening B provides an unobstructed view through which the operator may look downwardly and towards the right if desired, without any glare shielding in order to better see the right side of the road. The tabs 13 and 14 can be operated by knobs 17 and 18 so as to be moved into and out of position in the line of sight through opening A. These tabs are provided to eliminate excessive glare through the corners of the opening A.

Approaching headlights are also visible through the main body of the screen, but no glare is evident and the lights appear as red spots only. The shield is also effective as a sun glare shield. It can be brought into use during the day to prevent the discomfort experienced from direct or reflected sunlight. The tabs 13 and 14 are particularly useful to eliminate reflected glare from road surfaces which comes at an angle to the side of the screen.

From the foregoing description of the present invention it will be seen that I have devised a glare shield which is useful for reducing glare from both artificial and natural light. It will be also seen that I have devised a glare shield which is attractive and can be readily attached to vehicles.

While I have shown and described a preferred form of my invention, it will be understood that variations in details of form may be made without departure from the invention as defined in the appended claims.

I claim:

1. A glare shield comprising a screen, said screen consisting of two facing sheets of colored transparent material, two tabs of transparent material interposed between said two sheets and two guards extending respectively along opposite outer sides of said transparent sheets, each of said sheets and each of said guards having an opening therein, said openings being in longitudinal alignment, said guards and one of said sheets each having a second opening therein, said second openings being in longitudinal alignment, said screen further comprising two knobs having projecting portions thereon rotatably received in one of said guards and one of said sheets, said projecting portion of each one of said knobs being fixedly connected to one of said tabs, each of said tabs being movable by rotation of one of said knobs into and out of alignment with a side portion of each of said second openings, said tabs being normally out of alinement with said second opening, and a tape secured around the outer perimeter of said screen so as to maintain said sheets and guards in alignment.

2. The device of claim 1 further characterized by the fact that there are two spaced support rods disposed under said tape and extending outwardly from said screen, said support rods being adapted to be rotatably connected to a vehicle for rotatably mounting said screen.

References Cited in the file of this patent

UNITED STATES PATENTS

| | | |
|---|---|---|
| 1,178,435 | Wilson | Apr. 4, 1916 |
| 1,495,828 | Weller | May 27, 1924 |
| 1,516,502 | Rowntree | Nov. 25, 1924 |
| 1,982,511 | Geist | Nov. 27, 1934 |
| 2,230,012 | Peavey | Jan. 28, 1941 |
| 2,414,340 | Spraragen | Jan. 14, 1947 |
| 2,493,192 | Grey | Jan. 3, 1950 |
| 2,516,163 | Vaughan | July 25, 1950 |